United States Patent [19]

Hiromi et al.

[11] 4,416,999
[45] Nov. 22, 1983

[54] REFRACTORY POWDER FLAME PROJECTION MOLDINGS

[75] Inventors: Fukuoka Hiromi, Fukuokaken; Masataka Matsuo, Nakamashi; Kazuo Hamai, Kitakyusyushi; Tokuaki Hatta, Kitakyusyushi; Mituo Sugawara, Kitakyusyushi, all of Japan

[73] Assignees: Nippon Steel Corporation, Tokyo; Kurosaki Yogyo Co., Ltd., Fukuokaken, both of Japan

[21] Appl. No.: 290,202

[22] Filed: Aug. 5, 1981

[51] Int. Cl.³ .................. C04B 35/02; C04B 35/58
[52] U.S. Cl. ........................... 501/94; 501/96; 501/127
[58] Field of Search .............. 501/96, 127, 94; 427/423

[56] References Cited

U.S. PATENT DOCUMENTS 3,607,343  9/1971  Longo et al. ............... 501/127
3,954,479  5/1976  Jahn ............................ 501/127

Primary Examiner—James Poer
Attorney, Agent, or Firm—Wenderoth, Lind & Ponack

[57] ABSTRACT

Refractory moldings or repairing deposits formed by flame projection, composed of a solidified phase formed from fused fine refractory particles and nonfused coarse refractory particles dispersed in the solidified phase.

The moldings or deposits have high thermal shock resistance and erosion resistance.

They are produced by flame-projecting fine refractory particles and coarse refractory particles together into a mold or onto a substrate, e.g. onto a portion of a furnace to be repaired.

7 Claims, 3 Drawing Figures

REFRACTORY POWDER FLAME PROJECTION MOLDINGS

FIELD OF THE INVENTION

This invention relates to refractory moldings or repairing deposits formed by refractory powder flame projection (hereinafter simply referred to as "refractory powder flame projection moldings") and further relates to a process of producing the refractory powder flame projection moldings.

BACKGROUND OF THE INVENTION

As is well known, refractory powder flame projection is now being employed as a direct repairing method for various kinds of furnaces in the iron and steel and chemical industries. It is also being used for producing refractory moldings. The flame projection moldings and the repairs made by this method have excellent properties not obtainable by conventional methods.

In the conventional refractory powder flame projecting technique, refractory particles are supplied into the stream of a projected flame which carries the particles toward a substrate into which it causes them to collide in fused state so as to form an adhering layer on the substrate. Hence easily fusable refractory particles having a relatively fine particle size, for example a size below 210 microns, are used. In this flame projection method, the fused refractory particles successively form a dense and uniform continuous solidified structure and hence the deposited layers or moldings formed possess dense structures having high strength. However, the moldings or deposits having such dense and uniform structure have certain faults:

(1) They are low in thermal shock resistance.
(2) The shrinkage which results when the fused refractory particles cool and solidify causes internal stress to build up in the refractory moldings and this stress accumulates to the extent of causing breakage of the refractory molding or deposit.
(3) The shrinking phenomenon causes spalling of the refractory deposits formed on the substrate by flame projection.

These faults are caused by the internal thermal stress of the refractory moldings or refractory deposits and hence the greater the surface area and/or the thickness of the moldings or deposits, the more likely the moldings or deposits are to suffer breakage. These faults being attributable to the residual stress resulting from thermal stress accumulating from the initiation of the solidification, refractory moldings and deposits formed by flame projection are, in spite of their excellent properties, limited as to the size in which they can be produced.

SUMMARY OF THE INVENTION

An object of this invention is to provide refractory powder flame projection moldings having the above-described excellent properties specific to refractory moldings or deposits formed by refractory powder flame projection without having poor resistance to thermal shock resistance and spalling and without susceptibility to breakage by internal stress.

Another object of this invention is to provide large refractory powder flame projection moldings having thermal shock resistance as high as those of burned bricks and unburned bricks and also having erosion resistance as high as that of electrocast bricks.

Still another object of this invention is to provide a process of producing the aforesaid refractory powder flame projection moldings.

According to this invention, there are provided refractory powder flame projection moldings characterized by having nonfused refractory particles dispersed and imbedded in the solidified structure of the fused refractory.

According to another embodiment of this invention, there is provided a process of producing refractory powder flame projection moldings which comprises supplying fine refractory particles having a particle size of less than about 0.2 mm and coarse refractory particles having a particle size of 0.2–10 mm into the stream of a flame projected by a flame projecting burner and flame-projecting these particles into a mold, whereby the fused fine refractory particles form a solidified phase having the coarse refractory particles dispersed and imbedded therein.

DETAILED DESCRIPTION OF THE INVENTION

Figure 1:
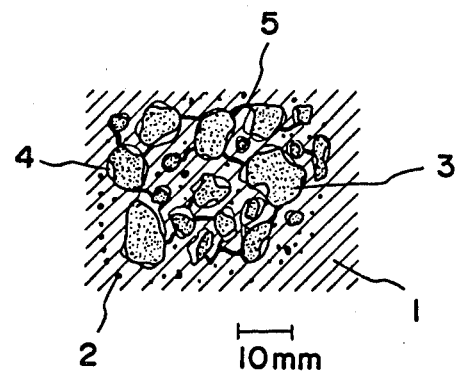
FIG. 1 is a schematic view showing the structure of the refractory powder flame projection molding of this invention.

In the course of comparing and investigating the properties of conventional refractory moldings and refractory deposits for repairing and the properties of moldings and deposits for repairing formed by refractory powder flame projection, the inventors succeeded in developing new refractory moldings and refractory deposits formed by the flame projection technique. More specifically, the inventors succeeded in developing novel and useful refractory moldings and refractory repairing deposits having thermal shock resistance as excellent as that of conventional burned or nonburned bricks and also having erosion resistance as excellent as that of conventional electrocast bricks. The refractory moldings and repairing deposits developed by the inventors are formed by refractory powder flame projection so as to have nonfused refractory particles dispersed in the solidified structure of the moldings or deposits.

In general, refractory moldings are classified into the burned type, the nonburned type, and the electrocast type according to the production process and each type has its own specific features. For example, the burned and nonburned refractory brick are produced by packing together refractory particles with a particle size of 7 mm and under and hence have a large number of open pores so that the fine particle portion of the material is weak. Therefore, when the refractory matrix is attacked by the erosive action of an erosive material such as blast furnace slag, converter slag, etc., the fine particle portion of the matrix is predominantly eroded. On the other hand, an electrocast refractory has a very dense and uniform structure and hence has high strength and high erosion resistance but is weak against the thermal shock caused by repeated heating and cooling and is also high in cost.

Now, since refractory powder flame projection moldings are formed by fusing and solidification of refractory particles, the structure is as uniform and dense as the structure of an electrocast brick and hence the moldings have excellent erosion resistance. On the other hand, they are inferior in thermal shock resistance.

Through various studies toward eliminating such faults of refractory powder flame projection moldings, the inventors have discovered that excellent thermal shock resistance can be imparted to refractory powder flame projection moldings by dispersing and imbedding nonfused coarse refractory particles in the dense matrix formed by the fusion and solidification of fine refractory particles.

This invention, which is based on this discovery, thus provides novel refractory moldings having thermal shock resistance as excellent as that of burned bricks and non-burned bricks and having strength and erosion resistance equal to those of electrocast bricks.

Also, according to this invention, the internal thermal stresses of the moldings occurring with solidification, which have been fatal defect in the production of refractory powder flame projection moldings, are broken up by the nonfused coarse refractory particles which are dispersed in the matrix of the moldings and disrupt the molding uniformity. As a result, breakage of the moldings by thermal stress can be avoided, making it possible to provide larger refractory powder flame projection moldings than those producible by the conventional method.

The refractory powder flame projection moldings of this invention can be produced using the refractory powder flame projecting burner apparatus disclosed in, for example, U.S. Pat. No. 4,192,460. In the conventional refractory powder flame projection method, refractory particles having sizes below about 0.2 mm are supplied to the stream of a projected flame and are projected onto a material in fused state. The refractory powder flame projection moldings of this invention can be easily produced by admixing coarse refractory particles having particle sizes of, preferably, about 0.2–10 mm with the aforesaid fine refractory particles in the above-described method or by continuously projecting the aforesaid coarse refractory particles into a flame projection molding being formed in a mold or on a material to be repaired from outside the system of the projected flame stream into which the aforesaid fine refractory particles are supplied.

In this invention the particle size of the aforesaid coarse refractory particles is limited to about 0.2–10 mm since if the particle size of the coarse refractory particles is greater than 0.2 mm, the particles can remain unfused while being carried by the stream of the projected flame and are thus dispersed and imbedded in the dense solidified structure of the fused fine refractory particles as nonfused coarse refractory particles. Moreover, imbedded particles of this size are effective in disrupting the uniformity of the dense solidified structure. On the other hand, if the particle size of the coarse refractory particles is over 10 mm, the density of the solidified structure is reduced, with the undesirable effect that the thermal shock resistance is lowered.

The preferred ratio between the fine and coarse refractory particles is 95–20 parts by weight of the fine refractory particles to 5–80 parts by weight of the coarse refractory particles.

The fine and coarse refractory particles may be of the same or different refractory material.

As the refractory materials, there can be used acid refractories such as siliceous refractories, semi-siliceous refractories, pyrophyllite refractories, chamotte refractories, etc.; neutral refractories such as high alumina refractories, carbonaceous refractories, chromium refractories, silicon carbide refractories, etc.; and basic refractories such as forsterite refractories, chrome-magnesia refractories, magnesia-chrome refractories, magnesia refractories, dolomite refractories, etc.

The coarse refractory particles can be closely imbedded in the moldings by adding them to the stream of the projected flame or by injecting them into the moldings formed of the fine refractory particles as the moldings solidify from the fused state. The amount of heat taken from the flame by the coarse refractory particles while they are being carried to the molding is very small and hence the fusion of the fine refractory particles is not hindered by the presence of the coarse particles.

Since the coarse refractory particles can be added to the flame projection moldings from outside the system of the stream of projected flame carrying the fine refractory particles, even materials which decompose or react at high temperature and cannot be used for flame projection can be used as the coarse particles in this invention. Therefore, combinations of materials hitherto considered to be impossible become possible and the material for the coarse refractory particles may be selected from a wide range of materials.

Therefore, as the nonfused coarse particles, it is possible to use not only such refractory materials as $SiO_2$—$Al_2O_3$ but also carbon or such carbides and nitrides as silicon carbide, silicon nitride, silicon oxynitride, etc.

The structure of the refractory powder flame projection moldings of this invention is schematically shown in FIG. 1. In the figure the portions shown by oblique lines indicate a solidified structure 1 of fused fine refractory particles, wherein fine closed pores 2 are interspersed. The portions shaded with fine dots indicate nonfused coarse particles 3 with diameters of 0.2–10 mm. The interface between the nonfused coarse particles 3 and the solidified structure 1 is composed of welded portions and fine cavities 4. In the solidified structure 1, there is a fine and complicated pattern of microcracks arising from the nonfused coarse particles.

The bonding strength between the nonfused coarse particles 3 and the solidified structure 1 is weak and the continuity of the solidified structure of fused fine refractory particles is complicatedly disrupted by the nonfused coarse particles 3. The clearance at the microcracks serves to absorb the expansion and contraction during abrupt heat change. The structural units formed by the microcracks are complicatedly interlocked with each other. Therefore, the structure obtained has excellent thermal shock resistance but suffers no degradation in denseness on the whole.

The features of the refractory powder flame projection moldings of this invention will now be described in comparison with conventional refractory moldings. For example, whereas a burned brick has a matrix composed of fine refractory particles which is inferior in erosion resistance, the corresponding part of the moldings of this invention is a dense solidified structure of fused fine refractory particles which has erosion resistance as high as that of moldings formed by electrocasting. The portion of a burned brick composed of middle-sized refractory particles with diameters of 0.2–10 mm and coarse refractory particles having a size of 1–10 mm corresponds to the non-fused coarse refractory particles having diameters of 0.2–10 mm which are uniformly distributed in the solidified structure of the fused fine refractory particles in the moldings according to this invention. Therefore, the refractory powder flame projection moldings of this invention possess both the high strength and high erosion resistance of an electrocast brick and the higher thermal shock resistance of a burned brick. That is, the refractory powder flame projection moldings of this invention are a new type of refractory moldings having properties not obtainable in conventional moldings by refractory powder flame projection. Also, the refractory powder flame projection moldings of this invention can be produced in large sizes since even in such large moldings, there occur no problems such as bending, deformation, spalling, crack formation, etc.

Figure 2:
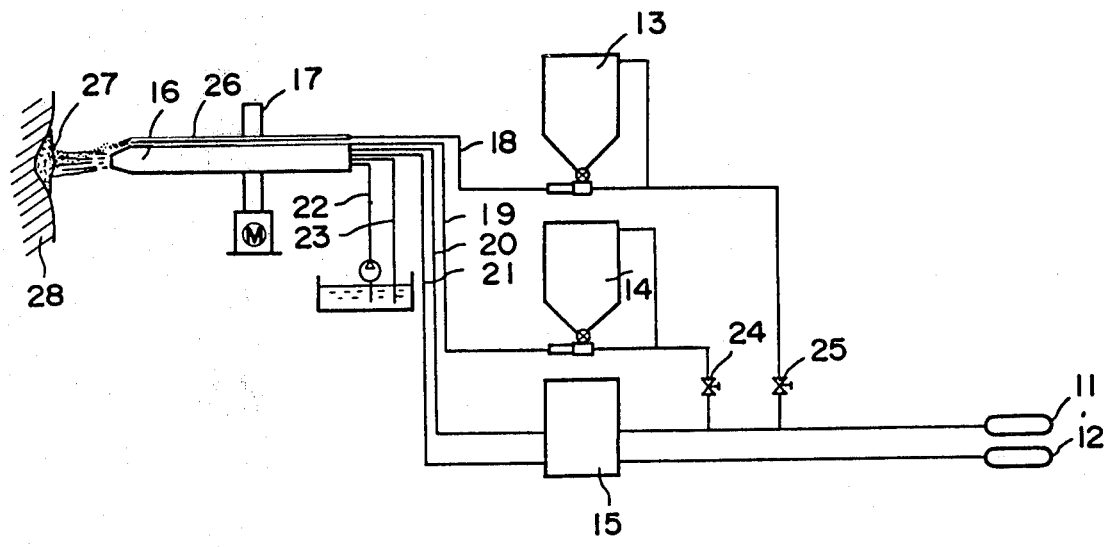
FIG. 2 is a view showing an embodiment of the apparatus for performing the process of this invention.

The invention will further be explained, with reference to the apparatus shown in FIG. 2, in connection with the formation of flame projection deposits for repairing the wall of, for example, a blast furnace. The apparatus shown in FIG. 2 is a modification of the apparatus disclosed in the specification and drawings of U.S. Pat. No. 4,192,460. In FIG. 2, the numeral 11 stands for a bottle of oxygen for supporting combustion and entraining particles, 12 a bottle of LPG for combustion, 13 a hopper for coarse refractory particles, 14 a hopper for fine refractory particles, 15 a gas regulator for controlling an LPG-$O_2$ combustion flame in a burner, and 16 a burner casing having a burner at the tip. The burner casing 16 contains a refractory powder supply pipe 19, an oxygen supply pipe 20, an LPG supply pipe 21 and burner cooling pipes 22 and 23. The numeral 18 indicates a coarse refractory particle supply pipe and 26 a nozzle for supplying coarse refractory particles. The burner casing 16 is equipped with a driving means 17 for moving the burner casing in any desired direction so as to bring it and the nozzle 26 to the portion 28 of the furnace requiring repair. The driving means 17 is powered by a motor M. The fine refractory particles carried and fused by the flame projected by the burner body 16 are deposited in a fused state on the portion 28 of the furnace requiring repair and the coarse refractory particles are ejected from the nozzle 26, whereby the flame projected fine refractory particles are deposited on the furnace wall intermixed with the coarse refractory particles which become dispersed and imbedded in the resulting repairing deposit.

Figure 3:
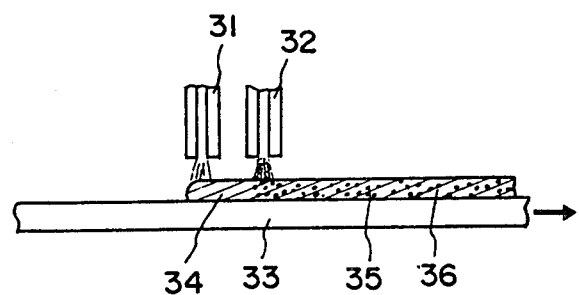
FIG. 3 is a view explaining an embodiment of the process of producing the refractory powder flame projection moldings of this invention.

FIG. 3 shows an embodiment of the process for producing the refractory powder flame projection moldings of this invention. In the figure the numeral 31 indicates a fine refractory powder flame projecting burner and 32 a coarse refractory particle flame projecting burner. Separate flame projecting burners 31 and 32 are shown in the figure for projecting fine refractory particles and coarse refractory particles, but the fine refractory particles and coarse refractory particles may be flame projected through a single flame projecting burner. A heat-resistant base plate 33 travels in the direction shown by an arrow and from the flame projecting burners 31 and 32 disposed above the base plate, fine refractory particles and coarse refractory particles are projected together with the projected flame streams. First, a flame deposited layer 34 of the fine refractory particles is formed on the base plate and then the coarse refractory particles 35 are successively dispersed and imbedded in the flame projected layer, whereby a flame projection molding 36 is continuously formed on the base plate 33. Thereafter, the flame projection molding 36 is released from the base plate 33 and cut into desired sizes. For facilitating the releasing operation of the molding, it is preferred that the base plate be made of a refractory material having good lubricating property, such as heat resistant cast steel, graphite, silicon carbide, etc., and when the base plate is made of heat resistant cast steel, it is preferable that it be provided with a cooling jacket. In addition, partitions extending in the width direction may be formed on the base plate at fixed intervals in the lengthwise direction to form flame projection moldings on the base plate separated by the partitions. Also, a box-like base plate may be employed for forming the refractory powder flame projection moldings. Furthermore, by selecting a refractory material which can be firmly bonded to flame projection moldings as the material for the base plate, composite type flame projection moldings can be obtained.

The invention will now be explained in connection with the following example.

EXAMPLE 1

Using a conventional refractory powder flame projecting burner, a refractory material having the following composition was flame projected by a propane flame to form a flame projection block containing non-fused coarse refractory particles according to this invention and a flame projection block according to the conventional flame projecting method, and the properties of these flame projection blocks and the properties of commercially available electrocast alumina brick and burned alumina brick were compared.

The refractory material used in the flame projection method of this invention and the conventional flame projection method was an alumina material having a chemical composition of 98.5% $Al_2O_3$ and 0.3% $SiO_2$. The refractory material was classified into coarse particles of 0.2–10 mm in diameter size and fine particles below 0.2 mm in diameter and for producing the conventional flame projection block, the fine particles below 0.2 mm in diameter only were used. The refractory powder flame projection block of this invention was obtained by depositing 60 parts by weight of the fine refractory particles below 0.2 mm in diameter on a heat resistant base plate by flame projection and projecting 40 parts of the coarse refractory particles of 0.2–10 mm in diameter size onto the deposit while the deposit was in a fused state. The properties of the flame projection block of this invention thus obtained, the conventional flame projection block, an electrocast alumina brick, and a burned brick are shown in Table 1.

In Table 1, the slag resistance test was performed using a horizontal type rotary erosion test machine. A prolonged slag erosion test was performed at a rotation number of 2 r.p.m., at a temperature of 1,600° C., and for a period of 30 hours. The slag used was prepared by mixing blast furnace slag and converter slag at a ratio of 1:1 by weight. After the test was completed, the amount of erosion of the samples was measured. The comparison of the samples was made using the amount of erosion of the burned alumina brick as a standard, i.e., by defining the erosion index thereof as 100. The thermal shock resistance was tested by repeating the operation of placing a $50 \times 50 \times 50$ mm$^3$ sample in an electric furnace, heating it rapidly to a temperature of 1,200° C., retaining the sample in the furnace for 15 minutes at this temperature, withdrawing the sample from the electric furnace and placing it in the air, and allowing it to cool for 15 minutes.

The thermal shock resistance in the table is expressed as the number of repeated thermal shocks required to cause cracks in the sample and the number of thermal shocks required before the sample could no longer retain its form and a part of it spalled.

As is clear from the results shown in Table 1, the flame projection block of this invention is excellent in thermal shock resistance and slag resistance as compared with the three kinds of conventional articles.

TABLE 1

| Tested property | (A) | (B) | (C) | (D) |
|---|---|---|---|---|
| Bulk specific gravity (g/cm$^2$) | 3.60 | 3.67 | 3.42 | 3.14 |
| Apparent porosity (%) | 4.8 | 2.9 | 2.8 | 16.5 |
| Chemical composition (%) | | | | |
| $Al_2O_3$ | 98.5 | 98.5 | 97.0 | 98.5 |
| $SiO_2$ | 0.3 | 0.3 | 0.7 | 0.3 |
| Thermal bending strength at 1,400° C. (kg/cm$^2$) | 280 | 320 | 250 | 150 |
| Slag resistance erosion index (—) | 8 | 6 | 12 | 100 |
| Thermal shock resistance | | | | |
| No. of shocks before cracking | 10 | 1 | 1 | 12 |
| No. of shocks before spalling | 23 | 1 | 4 | 25 |

(A): Flame projection block of this invention.
(B): Conventional flame projection block.
(C): Electrocast alumina brick.
(D): Burned alumina brick.

EXAMPLE 2

A flame projection block was produced in the same manner as in Example 1 using fine alumina particles of below 0.2 mm in diameter having a chemical composition of 98.5% $Al_2O_3$ and 0.3% $SiO_2$ as the fine refractory particles and electrocast magnesia particles of 0.2–10 mm in diameter size having a chemical composition of 99.9% MgO as the coarse refractory particles.

The properties of the flame projection block are shown in Table 2. On comparing the properties with the properties of the flame projection block shown in Table 1, it is found that the thermal bending strength and thermal shock resistance of the flame projection block are about the same as those of the flame projection block in Table 1 but that there is a further improvement in slag resistance.

TABLE 2

| Tested property | Flame projection block of this invention |
|---|---|
| Bulk specific gravity (g/cm$^2$) | 3.70 |
| Apparent porosity (%) | 4.9 |
| Chemical composition (%) | |
| Fine powder | |
| $Al_2O_3$ | 98.5 |
| $SiO_2$ | 0.3 |
| Coarse particles | |
| MgO | 99.9 |
| Thermal bending strength at 1,400° C. (kg/cm$^2$) | 290 |
| Slag resistance erosion index (—) | 5 |
| Thermal shock resistance | |
| No. of shocks before cracking | 9 |
| No. of shocks before spalling | 22 |

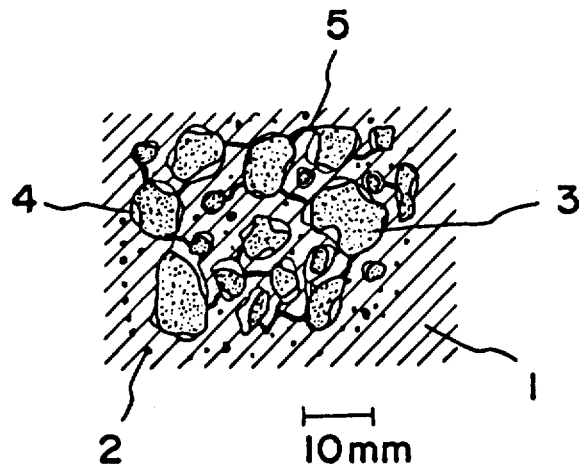

What is claimed is:

1. A refractory powder flame projection molding comprising nonfused refractory particles having a particle size of 0.2 to 10 mm dispersed and embedded in the solidified structure of a fused refractory material formed by the flame projection of a refractory material having a particle size less than 0.2 mm.

2. The refractory powder flame projection molding according to claim 1 wherein said nonfused refractory particles are dispersed and embedded by flame projection or spraying.

3. The refractory powder flame projection molding according to claim 1 wherein cavities exist at the interface between the solidified structure of a fused refractory and the nonfused refractory particles.

4. The refractory powder flame projection molding according to claim 1 wherein the solidified structure of a fused refractory is composed of the same material as the nonfused refractory particles.

5. The refractory powder flame projection molding according to claim 1 wherein the solidified structure of a fused refractory is composed of a different material from the nonfused refractory particles.

6. The refractory powder flame projection molding according to claim 1 wherein the nonfused refractory particles are dispersed and embedded in the solidified structure of a fused refractory in an amount of 5–80 parts by weight.

7. The refractory powder flame projection molding according to claim 1 wherein the refractory powder flame projection molding is a repairing deposit on the wall of a furnace.

* * * * *

UNITED STATES PATENT AND TRADEMARK OFFICE
CERTIFICATE OF CORRECTION

PATENT NO. : 4,416,999

DATED : November 22, 1983

INVENTOR(S) : HIROMI FUKUOKA, MASATAKA MATSUO, KAZUO HAMAI, TOKUAKI HATTA and MITUO SUGAWARA It is certified that error appears in the above—identified patent and that said Letters Patent is hereby corrected as shown below:

Title page, left hand column, line 2, change "Hiromi et al." to read "Fukuoka et al.".

Title page, left hand column, the section designated "[75] Inventors:", change "Fukuoka Hiromi" to read "Hiromi Fukuoka".

Signed and Sealed this

Twenty-first Day of August 1984

[SEAL]

Attest:

Attesting Officer

GERALD J. MOSSINGHOFF

Commissioner of Patents and Trademarks

UNITED STATES PATENT AND TRADEMARK OFFICE
CERTIFICATE OF CORRECTION

PATENT NO. : 4,416,999

DATED : November 22, 1983

INVENTOR(S) : Hiromi Fukuoka, Masataka Matsuo, Kazuo Hamai, Tokuaki Hatta and Mituo Sugawara It is certified that error appears in the above-identified patent and that said Letters Patent is hereby corrected as shown below:

At the bottom of the title page, cancel the figure of drawing set forth and insert therefor, the following: